June 19, 1928.
J. ROMEYN
1,674,571
TWO-STROKE INTERNAL COMBUSTION ENGINE
Filed May 1, 1926
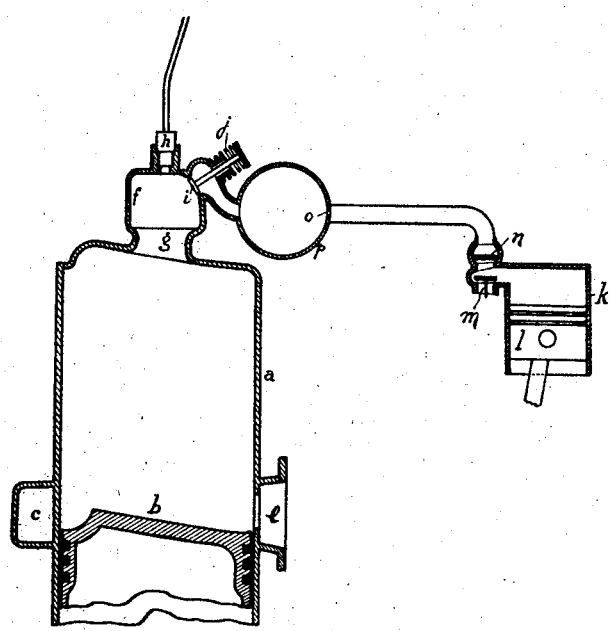
Inventor:
Jean Romeyn
Attorney.

Patented June 19, 1928.

1,674,571

UNITED STATES PATENT OFFICE.

JEAN ROMEYN, OF BRUSSELS, BELGIUM.

TWO-STROKE INTERNAL-COMBUSTION ENGINE.

Application filed May 1, 1926, Serial No. 106,045, and in Great Britain May 18, 1925.

When internal-combustion engines with terminal scavenging ports working on the two-stroke cycle are provided with a combustion-chamber separated from the cylinder and connected thereto by a restricted passage, it is generally found necessary to feed the combustion-chamber with a small quantity of scavenging air which enters through a special scavenging valve, for the reason that the restricted passage prevents the said chamber from being filled with the scavenging air entering through the terminal ports. In such engines, as constructed up to now, the additional scavenging valve is operated either mechanically or by air pressure.

When the valve is mechanically operated, the engine loses the remarkable simplicity which is one of the advantages of two-stroke port scavenging engines. On the other hand, when the valve opens under the working of the air pressure, it is liable to be noisy in operation, especially in large engines.

In the engine according to this invention, there is a scavenging pump, which is designed to feed only the small scavenging valves fitted to the combustion chambers of the various cylinders. This scavenging pump works at a pressure substantially higher than the pressure of the main scavenging air, so that a small auxiliary scavenging valve is sufficient to fill the combustion-chamber in the short time available. Of course, the increase in pressure of a part of the scavenging air means a loss of power, but this loss only affects a small part of the total quantity of scavenging air, and is largely compensated by the advantage of having a small scavenging valve.

When the pressure of the scavenging air entering the cylinders through the auxiliary scavenging valves is increased, the period of opening of these valves is lengthened towards the end of the compression. The consequence thereof is that a certain part of the scavenging air enters the cylinder after the closing of the exhaust ports. This fact can be made use of for supercharging, if the delivery of the auxiliary scavenging pump is increased accordingly. But as the compression of the air in the auxiliary scavenging pump uses more power than compression in the main scavenging pump, it will be generally more advantageous to avoid any supercharging effect, and to shorten the period during which the scavenging air enters the combustion chamber. Therefore, according to the invention, a small reservoir may be provided immediately in front of the auxiliary scavenging valve of each combustion chamber and this reservoir is fed from the scavenging pump through a small opening.

In this way, when the pressure at the end of the expansion drops below the pressure of the auxiliary scavenging air, the scavenging valve opens, and the air contained in the aforesaid reservoir scavenges the combustion chamber.

The pressure in the reservoir however drops very quickly, and the quantity of air supplied to the combustion chamber after this rush of air into it, is only the small quantity which can pass through the small opening between the pump and the reservoir.

An embodiment of the invention is represented diagrammatically by way of example in vertical section in the accompanying drawing. $a$ is the cylinder of the engine, $b$ the piston thereof, $c$ represents one of the scavenging ports, and $e$ one of the exhaust ports.

Combustion takes place in the chamber $f$, which is in communication with the main cylinder through the restricted passage $g$, $h$ is an injector of any known construction and $i$ the auxiliary scavenging valve, which opens inwardly and is kept on its seat by means of the spring $j$. $k$ represents the cylinder of the scavenging pump, $l$ is the piston thereof, and $m$ and $n$ are the suction and delivery valves. The scavenging pump $k$ delivers air at a pressure P substantially higher than the pressure $P^1$ of the main scavenging air, through the small opening $o$ into the reservoir $p$. At the end of the expansion stroke, when the exhaust ports $e$ are opened, the pressure in the main cylinder drops rapidly and when it becomes less than the pressure P, the valve $i$ opens, and the air contained in the reservoir $p$ rushes into the combustion chamber $f$ and expels the burnt gases contained therein. In the meantime, scavenging takes place in the main cylinder through the ports $c$, and the burnt gases expelled from the combustion chamber $f$ are thereafter expelled from the main cylinder also by the scavenging air entering through the ports $c$. The volume of the reservoir $p$ is such that the pressure in it and in the combustion chamber $f$ is substantially equalized with the pressure in the main cylinder, before the exhaust ports $e$ are closed. Consequently, when the ports $e$ are closed and compression starts, the valve $i$ is closed, and the pressure in the reservoir $p$ increases gradually up to the pressure P.

It is also possible to avoid the use of the reservoir $p$, but then the valve $i$ closes later, i. e. when the pressure in the cylinder becomes equal to the pressure P of the auxiliary scavenging air. As it is necessary that the burnt gases be expelled from the chamber $f$ before the process of scavenging is finished in the main cylinder, it is then necessary to make the delivery of the pump $h$ substantially larger than would be required for filling only the combustion chamber with fresh air, and the power required for driving the pump is larger. On the other hand, there is a certain super charging which increases the power which is produced by the cylinder.

What I claim is:

1. In an internal combustion engine, a cylinder; a piston working therein; a combustion chamber at one end of the cylinder; a restricted passage providing communication between the chamber and cylinder; said cylinder having a scavenging air inlet and an outlet which are opened by said piston near the end of its power stroke; a reservoir for auxiliary scavenging air; a duct leading from said reservoir to the combustion chamber; a normally closed valve controlling communication between said duct and said chamber; and means for feeding air to the reservoir at a pressure substantially higher than the pressure in the cylinder.

2. In an internal combustion engine, a cylinder; a piston working therein; a combustion chamber at one end of the cylinder; a restricted passage providing communication between the chamber and cylinder; said cylinder having a scavenging air inlet and and outlet which are opened by said piston near the end of its power stroke; a reservoir for auxiliary scavenging air; a duct leading from said reservoir to the combustion chamber; a normally closed valve controlling communication between said duct and said chamber; and means for feeding air to the reservoir at a pressure substantially higher than the pressure in the cylinder, said reservoir having a small inlet orifice to admit such air.

In testimony whereof I affix my signature.

JEAN ROMEYN.